Patented July 6, 1926.

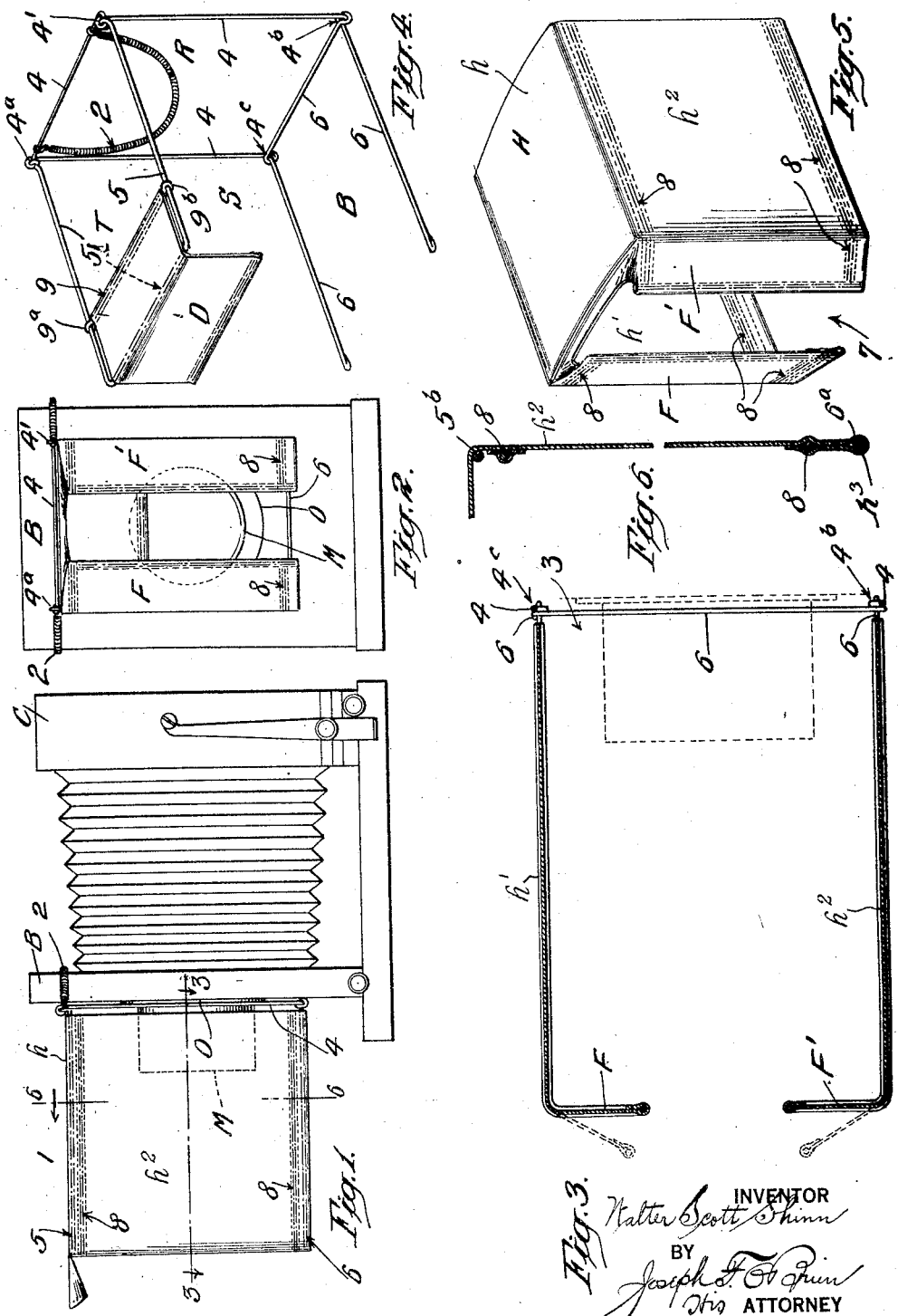

1,591,567

UNITED STATES PATENT OFFICE.

WALTER SCOTT SHINN, OF DOBBS FERRY, NEW YORK.

LENS HOOD.

Application filed June 25, 1925. Serial No. 39,449.

This invention relates to improvements in lens hoods for shading a camera objective from light rays.

One of the objects of this invention is to produce a lens hood which may be readily and quickly erected and mounted over a camera objective to shade the same, particularly from the direct rays of the sun or flash-light or from any undesirable light rays which might blur or otherwise injuriously affect the image; another object is to enable the shading of the objective to keep out undesirable light rays which may come from any angle but admit desirable light rays which may be reflected from the object or otherwise; another object is to provide a readily variable opening at the front end of a lens hood and preferably a rectangular opening which may be readily and quickly varied in the dimensions of width and height; another object is to provide a lens hood of simple construction which may be readily knocked-down and which will occupy a minimum of space when in knocked-down condition; another object is to enable the production from cloth or like material of a lens hood in which the opening at the front may be varied and maintained at any desired dimensions; another object is to provide a hood having flaps of cloth or the like which by a mere movement thereof may be automatically set at any desired angle and which will maintain such set position; another object is to provide a hood embodying a knock-down skeleton composed of wire and a cloth hood; and still another object is to provide the lens hood with elastic means preferably in the form of a metallic coil spring for engaging the lens mount to definitely retain and locate the hood over the lens.

With these and other objects in view, the invention comprises the combination of members and arrangement of parts so combined as to co-act and cooperate with each other in the performance of the functions and the accomplishment of the results herein contemplated, and comprises in one of its adaptations the species or preferred form illustrated in the accompanying drawings, in which:—

Fig. 1 is a side elevation of a camera having a lens hood of my invention mounted thereon;

Fig. 2 is a front elevation of the lens hood and camera shown in Fig. 1;

Fig. 3 is a section on the line 3—3 of Fig. 1;

Fig. 4 is a view, in perspective, of a knock-down skeleton-frame employed by me;

Fig. 5 is a perspective view of a hood cloth adapted to be placed over the skeleton frame to produce a lens hood of my invention; and Fig. 6 is a section on the line 6—6 of Fig. 1.

Referring now to these drawings, which illustrate a preferred embodiment of my invention, 1 indicates a lens hood embodying my invention which is detachably mounted over the objective O of a camera C, and, as illustrated, is attached to the lens-mounting board B by an elastic element preferably comprising a coil-spring 2.

The lens hood 1 comprises in the preferred form illustrated a body portion in the form of a rectangular parallelepiped of any suitable length having at its rear end an opening 3 to fit over the lens mount M of the objective O and having at its front end an opening 7, preferably rectangular in conformation so as to correspond with the shape of photographs to be taken by the camera, which front opening 7, however, is variable in dimensions to exclude undesirable light. The width of the front opening is variable by side flaps F, F' and the height or length of the opening is variable by a drop curtain D so that these elements in combination may be employed to exclude or shade undesirable light rays coming toward the lens from any side angle or from the top. The bottom is preferably left open as there is practically no undesirable light from this direction. It may, however, be shaded under special conditions if desired, by inserting in the hood on the bottom frame, a separate piece of pasteboard or the like.

In the embodiment illustrated, the lens-hood is composed of a fabric, such as cloth, and a skeleton S composed of a rear-frame member R forming a base and top and bottom frame members T and B respectively which fold in relation to said base. As illustrated, the skeleton S comprises a single wire 4 bent to provide top and side rails and having eyes 4', 4ª, 4ᵇ and 4ᶜ. Hingedly mounted at the top of the base R is a top frame T and at the opposite end a bottom frame B. The top frame, as shown, is composed of a wire 5 bent to provide a front rail and side rails and having eyes cooperating with the eyes of the base R. The bottom frame is likewise composed of a single wire 6 bent to provide a rear rail and two free side rails, said wire also being provided with eyes cooperating with the eyes of the base. The eyes of the top frame T and of the bottom frame B of the skeleton are so connected to the rear frame R that when turned on one side of said frame R, a locking engagement will result and said frames will project therefrom at right angles to provide a skeleton for the hood while if said top and bottom frames are pivotally turned to the opposite side of said rear or base frame, the respective wires of the top frame T and the bottom frame B will fold into the same plane as the wires of the frame R, thus enabling the skeleton to be completely knocked-down and folded into flat condition.

In the preferred embodiment of my invention, I erect the skeleton frame S as shown in Fig. 4 and then mount on said skeleton a hood H of fabric, cloth or other similar material which cloth, when not in use, may, of course, be folded up into a flat condition. The cloth hood, when mounted and supported on the skeleton frame has a body portion which assumes the shape of a rectangular parallelepiped having a stationary top wall $h$ and stationary side walls $h'$ and $h^2$, the hood as aforesaid being preferably completely open at its rear end to permit attachment over the lens mount, also open at its bottom because no undesirable light enters therethrough and also having, at its front end a rectangular opening 7 variable in dimensions.

In said preferred form of my invention, the opening 7 is variable by the provision on the side walls of the fabric H of the lenshood of side flaps F, F', said side walls and flap being preferably provided with wire inserts 8 adjacent to the top and bottom edges thereof so that when these side flaps F, F' are bent into any particular position in relation to the opening 7, they will automatically retain the position to which they are so bent as aforesaid, and the width of the front opening may thus be varied to shut out undesirable light from any angle. In order to vary the length or height of the opening 7, a drop curtain D is employed. As shown, this curtain is mounted upon a rod 9 having eyes at opposite ends $9^a$ and $9^b$ which slide upon the rods or rails of the top frame, thus permitting the drop curtain D to be pulled down or moved up to any desired position. It will thus be seen that the combination of the drop curtain D and the flaps F, F' enable an opening 7 of rectangular conformation which corresponds with the usual conformation of photographs to be varied in width and length.

It will, furthermore, be seen that by simple movement of the flaps F, F' they will be caused automatically to maintain any position to which they moved into and thus by manipulation of these flaps, undesirable rays of light coming from any angle at the side may be shaded or cut off from the lens while desirable light such as rays reflected from the object to be photographed may be passed to the lens.

In the preferred form of my invention, the bottom edges of the sides of the fabric hood are provided with a loop $h^3$ into which the rails 6, $6^a$ of the bottom frame are adapted to be inserted during the assembly of the hood to securely support and retain the fabric on the skeleton.

The wire inserts 8 are preferably formed of copper or such other bendable material as will retain the shape into which it is bent.

Having described my invention, I claim:—

1. A lens hood for cameras having at its front end an opening, and a light-shading member mounted to swing across said front end for varying the size of said opening embodying a deformable element of low elastic limit and having the property of retaining any position to which it is set.

2. A lens hood for cameras embodying a hood having at its front end an opening, and flaps for varying the size of said opening, each composed of a fabric and a metallic element of relatively low elastic limit, whereby permanent deformation of said metallic element will enable the flap to be set and automatically to retain any position to which it may be moved.

3. A lens hood for cameras embodying a hood of flexible material having an opening at its front end, flaps at said opening, each adapted to be set and automatically to retain any position to which it is moved for varying the width of said opening, and an adjustable drop curtain for varying the length of said opening.

4. A lens hood for cameras embodying a supporting frame, a hood composed of fabric supported on said frame and having an opening at its front end, flaps connected at the front end of said hood for varying the width of said opening, each of said flaps being composed of fabric combined with a readily deformable element having the property of automatically retaining any position to which it is moved, and means for varying the length of said opening.

5. A lens hood for cameras embodying a supporting frame, a hood composed of fabric supported on said frame and having an opening at its front end, flaps connected at the front end of said hood for varying the width of said opening, each of said flaps being composed of fabric combined with a readily deformable element having the property of automatically retaining any position to which it is moved, and an adjustable drop curtain for varying the length of said opening.

6. A lens hood for cameras embodying a skeleton frame comprising a base frame and top and bottom frames pivotally connected at opposite ends of said base frame and movable to project into horizontal position on one side of said base frame and into folded relationship at the opposite side thereof, and a demountable and foldable hood cooperating with said frame to provide a lens hood for a camera.

7. A lens hood for cameras embodying a skeleton frame comprising a base frame and top and bottom frames pivotally connected at opposite ends of said base frame and movable to project into horizontal position on one side of said base frame and into folding relationship at the opposite side thereof, and a demountable and foldable hood composed of fabric cooperating with said frame to provide a lens hood for a camera.

8. A lens hood for cameras embodying a skeleton frame comprising a base frame and top and bottom frames pivotally connected at opposite ends of said base frame and movable to project into horizontal position on one side of said base frame and to folding relationship at the opposite side thereof, and a demountable and foldable hood composed of fabric engaged at its bottom edges with the bottom frame members of said skeleton frame.

9. A lens hood for cameras embodying a skeleton frame comprising a base frame and top and bottom frames pivotally connected at opposite ends of said base frame and movable to project into horizontal position on one side of said base frame and to folding relationship at the opposite side thereof, and a demountable and foldable hood composed of fabric engaged at its bottom edges with the bottom frame members of said skeleton frame, said hood also having at its front edge side flaps embodying a deformable element of low elastic limit having the property of automatically retaining any position to which it may be moved.

10. A lens hood for cameras embodying a skeleton frame comprising a base frame and top and bottom frames pivotally connected at opposite ends of said base frame and movable to projecting position on one side of said base frame and to folding condition at the opposite side thereof, and a demountable and foldable hood composed of fabric engaged at its bottom edges with the bottom frame members of said skeleton frame, said hood having at its front edge side flaps embodying a deformable element of low elastic limit having the property of automatically retaining any position to which it may be moved and a drop curtain mounted on the top frame of the skeleton having a portion extending over said front opening.

In witness whereof, I have signed my name to the foregoing specification.

WALTER SCOTT SHINN.